Feb. 14, 1928.
J. MAGIN
BORING BAR
Filed Sept. 10, 1923
1,659,370
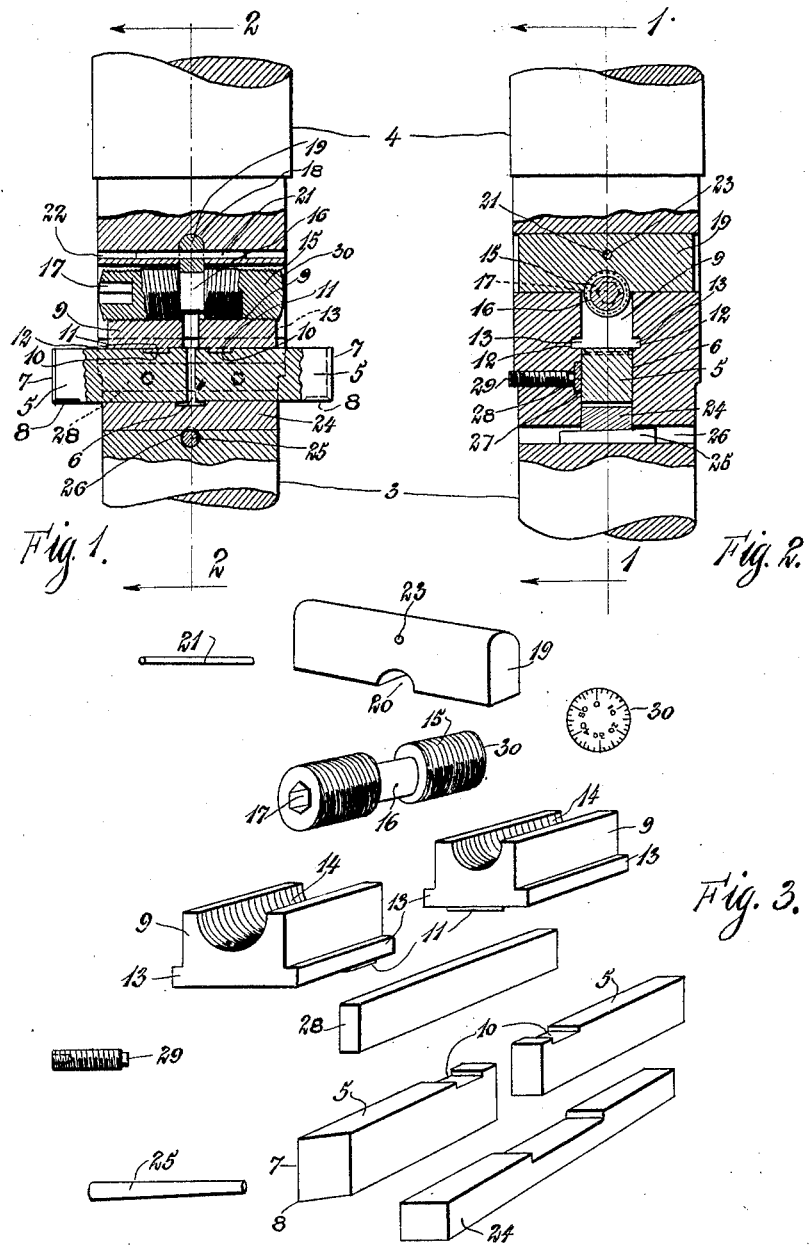
INVENTOR.
John Magin.
BY Roger Sherman Hoar
ATTORNEYS.

Patented Feb. 14, 1928.

1,659,370

UNITED STATES PATENT OFFICE.

JOHN MAGIN, OF SOUTH MILWAUKEE, WISCONSIN.

BORING BAR.

Application filed September 10, 1923. Serial No. 662,009.

My invention relates to new and useful improvements in boring bars, and has for its principal object to provide a boring bar, easily adjustable, easily operable, of rugged construction and containing relatively few and simple parts.

A further object of my invention is to provide a cutter-bar wherein the cutters can be adjusted to a very considerable extent and yet to a nicety, and can then be locked against movement, the locking mechanism being such that it is not easily displaced, and furthermore serves to lock the cutters without any strain being put upon the adjusting mechanism.

The chief trouble with all cutter bars prior to mine, has been the limited range of adjustment, which greatly shortens the life of the cutters.

Other advantages of the simple design of my boring bar will naturally suggest themselves as the description progresses. It is within the province of the disclosure to improve generally and to enhance the utility of devices of that type to which the invention appertains.

With these general objects in view, the invention resides in the novel features of construction, combination and arrangement of parts which will be hereinafter more particularly described and claimed, and shown in the accompanying drawings, wherein:

Figure 1 is a partial longitudinal section of the boring bar, taken in the plane of the cutters, as indicated by the arrows 1 in Figure 2.

Figure 2 is a partial longitudinal section of the boring bar, at right-angles to that of Figure 1, as indicated by the arrows 2 in Figure 1.

Figure 3 shows, in perspective, the disassembled parts of the adjusting and locking mechanism.

Referring more particularly to the drawings, it will be seen that 3 represents the front portion and 4 the rear portion of the bar proper.

A pair of cutters 5 is adjustably positioned in a slot 6 in the bar, and have their outer edges 7 and their front edges 8 bevelled for cutting when pressed against an object as the bar is rapidly rotated.

The same slot 6 also carries chuck-nuts 9, which are keyed into recesses 10 of the cutters 5 by means of projections 11, and which are slidably keyed into recesses 12 of the slot 6 by means of slides 13. The rear surface (upper in the figure) of each chuck-nut carries a semi-cylindrical threaded groove 14, the two grooves being oppositely threaded.

The same slot 6 also carries a chuck-screw 15, having a neck 16 in the middle and having its ends oppositely threaded, so as to engage the threads of the chuck-nuts 9. In one end of the chuck-screw is a polygonal socket 17.

To the rear of slot 6 and at right angles to it and partly cutting it, is a slot 18, carrying a locating plate 19. This plate has a recess 20 to engage the neck 16 of the chuck-screw 15. The plate is held in place by a pin 21, passing through a hole 22 in the shaft 3 and a hole 23 in the plate.

The slot 6 carries, to the front of the cutters 5, a liner 24, which can be clamped against the front face of the cutters 5, by driving taper-pin 25 into a hole 26 of the shaft 3.

A lateral recess 27 of the slot 6 carries a second liner 28, which can be clamped against one lateral face of the cutters 5, by means of set-screws 29, which have socket-heads.

One end 30 of the chuck-screw 15 may, if desired, be graduated as a micrometer gauge.

The method of assembling and disassembling the boring bar is readily evident from the foregoing description of its parts.

Adjustment is accomplished as follows. Knock out taper-pin 25 and loosen set-screws 29. Insert a key-wrench in one of the polygonal sockets 17 of the chuck-screw 15. Turn until the blades 7 of the cutters 5 are the proper distance apart. Tighten the set-screws 29 and drive in the taper-pin 25.

It should be noticed that use of the chuck-screw enables a much wider range of adjustment than would be possible with the conventional wedge-screw driven between the butts of the cutters. Thus the cutters of my device can be ground down long after the cutters of the conventional device would have to be discarded.

Also note that the threading of the chuck-nuts is greatly facilitated by having them separate from the cutters, for thus the chuck-nuts can be made of softer and more easily worked metal than the cutters.

Also note that the strain due to clamping the liner 24 against the cutters is taken up by the slides 13 against the recesses 12, instead of being transmitted to the adjusting-screw as in all prior devices of this class.

Also note the clamping effect of liner 28 against lateral wobbling of the cutters, this feature being unique in my device.

I do not intend to be limited to the particular foregoing exemplification of my invention, but rather intend to avail myself of all equivalents.

I claim:

1. In a boring bar, the combination of: a recessed shaft; two oppositely-moving adjustable cutter-blades therein; two nuts, one of which is removably keyed to one of said blades by a simple projection and recess, and the other of which is similarly keyed to the other of said blades, both nuts being slidably keyed into the interior of the recess of said shaft; a right-and-left-hand-threaded screw, engaging said nuts so as to convert its rotation into their translation, and having a constricted portion; a collar, removably engaging said constricted portion, and slidable into and out of said shaft; pin means for holding said collar in position; means operable upon the front edge of said blades for clamping said blades against motion longitudinally of said shaft; and distinct means operable upon the side face of said blades, for clamping said blades against rotation with respect to said shaft about the axis of said shaft.

2. In a boring bar, the combination of: a recessed shaft; two oppositely-moving adjustable cutter-blades therein; two nuts, one of which is removably keyed to one of said blades by a simple projection and recess, and the other of which is similarly keyed to the other of said blades, both nuts being slidably keyed into the interior of the recess of said shaft; a right-and-left-hand-threaded screw, engaging said nuts so as to convert its rotation into their translation, and having a constricted portion; a collar, removably engaging said constricted portion, and slidable into and out of said shaft; pin means for holding said collar in position; means operable upon the front edge of said blades for clamping said blades against motion longitudinally of said shaft; and distinct means operable upon the side face of said blades, for clamping said blades against rotation with respect to said shaft about the axis of said shaft; each of said last two mentioned means comprising a liner and means for bringing pressure to bear on said liner, whereby each liner serves to prevent loosening of its pressure means.

JOHN MAGIN.